(12) United States Patent
Waalkes et al.

(10) Patent No.: US 9,699,315 B2
(45) Date of Patent: Jul. 4, 2017

(54) COMPUTER-IMPLEMENTED SYSTEM AND METHOD FOR PROCESSING CALLER RESPONSES

(71) Applicant: Intellisist, Inc., Bellevue, WA (US)

(72) Inventors: Adam Waalkes, Sammamish, WA (US); Alastair Sutherland, Seattle, WA (US); Gilad Odinak, Bellevue, WA (US); Haodong Howard Jiang, Issaquah, WA (US)

(73) Assignee: Intellisist, Inc., Seattle, WA (US)

( * ) Notice: Subject to any disclaimer, the term of this patent is extended or adjusted under 35 U.S.C. 154(b) by 115 days.

(21) Appl. No.: 13/893,231

(22) Filed: May 13, 2013

(65) Prior Publication Data

US 2013/0251118 A1    Sep. 26, 2013

Related U.S. Application Data

(63) Continuation of application No. 11/893,442, filed on Aug. 15, 2007, now Pat. No. 8,442,209.

(60) Provisional application No. 60/838,102, filed on Aug. 15, 2006.

(51) Int. Cl.
| | |
|---|---|
| H04M 1/64 | (2006.01) |
| H04M 3/523 | (2006.01) |
| H04M 3/22 | (2006.01) |
| H04M 3/51 | (2006.01) |
| H04M 3/527 | (2006.01) |

(52) U.S. Cl.
CPC ....... *H04M 3/5235* (2013.01); *H04M 3/2281* (2013.01); *H04M 3/51* (2013.01); *H04M 3/527* (2013.01); *H04M 2201/40* (2013.01); *H04M 2201/60* (2013.01)

(58) Field of Classification Search
CPC .......... H04M 2201/41; H04M 3/5235; H04M 3/2281
USPC ... 379/88.01, 265.01–265.14, 266.01–266.1, 379/309
See application file for complete search history.

(56) References Cited

U.S. PATENT DOCUMENTS

| | | | | |
|---|---|---|---|---|
| 6,100,891 | A * | 8/2000 | Thorne | 715/854 |
| 6,102,970 | A * | 8/2000 | Kneipp | 717/155 |
| 6,771,746 | B2 * | 8/2004 | Shambaugh et al. | 379/88.13 |
| 6,849,045 | B2 * | 2/2005 | Iliff | 600/300 |
| 6,959,080 | B2 * | 10/2005 | Dezonno et al. | 379/265.07 |
| 8,463,606 | B2 * | 6/2013 | Scott | H04M 3/42221 379/88.03 |
| 8,693,660 | B2 * | 4/2014 | Bhow | 379/202.01 |
| 8,898,676 | B2 * | 11/2014 | Hiltgen | G06F 8/60 717/100 |
| 2002/0161589 | A1 * | 10/2002 | Strandberg | G06Q 10/107 705/1.1 |

(Continued)

*Primary Examiner* — William Deane, Jr.
(74) *Attorney, Agent, or Firm* — Patrick J. S. Inouye; Krista A. Wittman

(57) ABSTRACT

A computer-implemented system and method for processing caller responses is provided. Scripts each including at least one block of dialog are stored. Information is received from a caller during a call with an agent. A selection of a least one of the scripts is received from the agent based on the received information from the caller. The selected script is presented to the caller. A response is received from the caller. A direction of the call is changed. A further selection of one of the scripts is received from the agent based on the response from the caller. The further selected script is presented to the caller.

20 Claims, 7 Drawing Sheets

(56) References Cited

U.S. PATENT DOCUMENTS

| | | | |
|---|---|---|---|
| 2003/0059016 A1* | 3/2003 | Lieberman et al. | 379/201.03 |
| 2003/0172185 A1* | 9/2003 | Dezonno | H04M 3/5183 709/246 |
| 2004/0039776 A1* | 2/2004 | Ballard | G06F 17/30902 709/203 |
| 2004/0057571 A1* | 3/2004 | Browne et al. | 379/266.01 |
| 2004/0080535 A1* | 4/2004 | Lueckhoff | G06Q 10/10 715/758 |
| 2005/0094798 A1* | 5/2005 | Yacoub | 379/265.12 |
| 2005/0216551 A1* | 9/2005 | Sirstins et al. | 709/202 |
| 2006/0023867 A1* | 2/2006 | Saleh | H04M 3/5183 379/265.09 |
| 2006/0095273 A1* | 5/2006 | Montvay et al. | 705/1 |
| 2007/0005776 A1* | 1/2007 | Hansen et al. | 709/227 |
| 2007/0203708 A1* | 8/2007 | Polcyn | H04M 3/42221 704/270.1 |
| 2010/0132035 A1* | 5/2010 | Nanaumi | G06F 21/82 726/19 |
| 2010/0286490 A1* | 11/2010 | Koverzin | 600/301 |
| 2011/0010173 A1* | 1/2011 | Scott | H04M 3/42221 704/235 |
| 2012/0219126 A1* | 8/2012 | Odinak | H04M 3/51 379/88.14 |

* cited by examiner

Fig. 4.

COMPUTER-IMPLEMENTED SYSTEM AND METHOD FOR PROCESSING CALLER RESPONSES

CROSS-REFERENCE TO RELATED APPLICATION

This non-provisional patent application is a continuation of U.S. Pat. No. 8,442,209 issued on May 14, 2013, which claims priority to U.S. Provisional Patent Application Ser. No. 60/838,102, filed Aug. 15, 2006, the disclosures of which are incorporated by reference.

FIELD

The present invention relates in general to automated call center operation and, in particular, to a system and method for processing out-of-order caller responses during automated call processing.

BACKGROUND

Customer call centers, or simply, "call centers," are often the first point of contact for customers seeking direct assistance from manufacturers and service vendors. Call centers are reachable by telephone, including data network-based telephone services, such as Voice-Over-Internet (VoIP), and provide customer support and problem resolution. Although Worldwide Web- and email-based customer support are becoming increasingly available, call centers still offer a convenient and universally-accessible forum for remote customer assistance.

The timeliness and quality of service provided by call centers is critical to ensuring customer satisfaction, particularly where caller responses are generated through automation. Generally, the expectation level of callers is lower when they are aware that an automated system, rather than a live human agent, is providing assistance. However, customers become less tolerant of delays, particularly when the delays occur before every automated system-generated response. Minimizing delays is crucial, even when caller volume is high.

To properly service callers, agents frequently need to perform troubleshooting or diagnosis to identify the cause of the problem or service required. Fully automated interactive voice recognition (IVR) based call centers rely on scripted exchanges with callers that are intended to elicit specific information in a predefined sequence, which may not be user-friendly or responsive to urgent needs. In addition, while some of the information may be critical to resolving the situation, other information may not be essential and could either be deferred or omitted entirely.

Fully automated system interfaces generally are not as user friendly as a live agent, as interacting with the automated system through a scripted caller interface may be awkward or uncomfortable to callers. Moreover, callers that are under stress or in a hurry may be unable or unwilling to answer questions in a particular order, preferring answering questions through regular conversational speech in a free form format. As a result, an inflexible script could force a loss of information or require repeated questions, which can in turn lead to decreased caller experience due to frustration or loss of confidence.

Therefore, there is a need to accommodate non-sequential and non-linear information gathering by call center agents, which allows caller interactions to progress free form in a more natural and conversational order than might ordinarily be experienced with automated caller response systems.

SUMMARY

Automated call center agents are each able to process several callers at a time through an agent console that includes a graphical user interface. The agent interacts indirectly with each caller session through a separate window or screen view displayed on the agent console in which a running non-linear and non-sequential dialogue between the agent and the caller is displayed. The caller hears questions from the agent as machine-generated dialogue, but is able to respond using natural speech, dual-tone multi-frequency (DTMF) tones, text messages, or other form, which can be free form. If possible, the information essential to determining the proper disposition of each call is first gathered, after which appropriate topics can be discussed or return information provided. The agent can review the conversation at any point during a caller session to collect information that may have been missed or which was applicable to another topic to minimize repetition and facilitate efficient troubleshooting and problem resolution.

A further embodiment provides a computer-implemented system and method for processing caller responses. Scripts each including at least one block of dialogue are stored. Information is received from a caller during a call with an agent. A selection of a least one of the scripts is received from the agent based on the received information from the caller. The selected script is presented to the caller. A response is received from the caller. A direction of the call is changed. A further selection of one of the scripts is received from the agent based on the response from the caller. The further selected script is presented to the caller.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a screen diagram showing, by way of example, a view of an agent console for a live call session.

DETAILED DESCRIPTION

Automated Call Center Operational Environment

Figure 1:
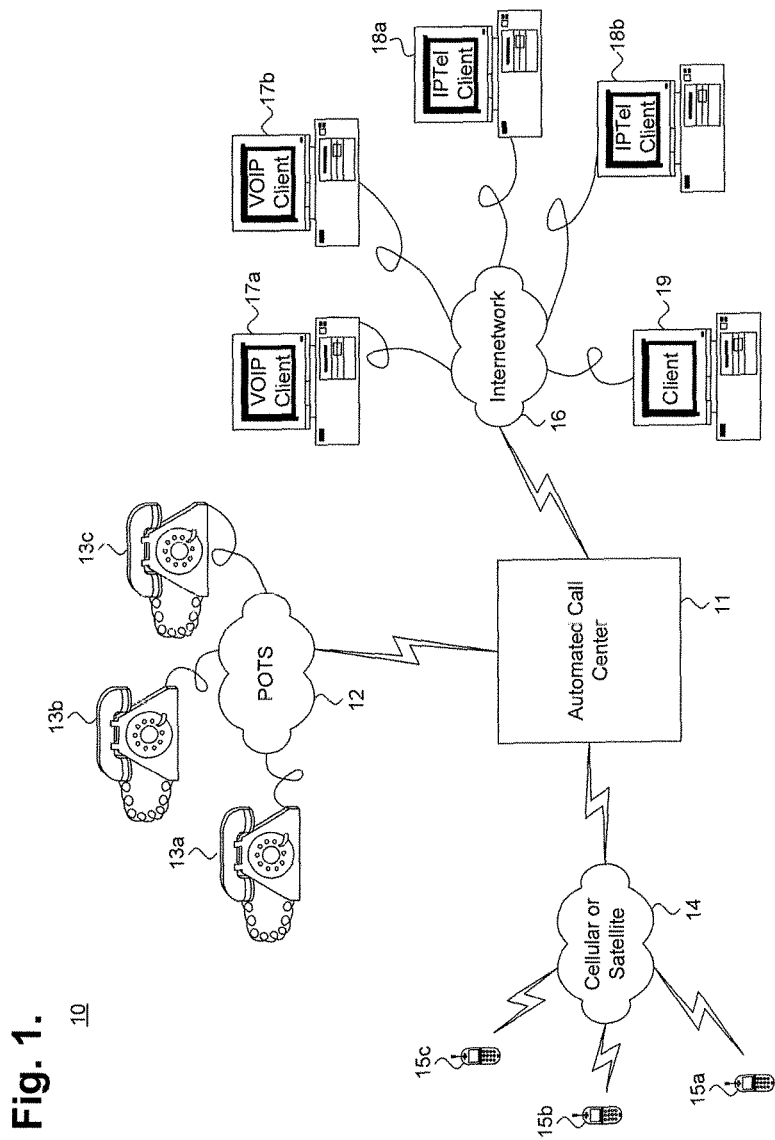
FIG. 1 is a functional block diagram showing an automated call center operational environment.

Automated call centers are a form of voice-response system, which rely upon programmed control to guide callers through a machine-generated dialogue for receiving support and problem resolution assistance. FIG. 1 is a functional block diagram showing an automated call center operational environment 10. By way of example, a multiplicity of callers call into an automated call center 11, generally through telephonic means, which can include conventional telephone handsets 13a-c through Plain Old Telephone Service (POTS) 12, portable handsets 15a-c through cellular and satellite telephone service 14, VoIP clients 17a-b, and Internet telephony clients 18a-b, as well as other forms and combinations of telephony, message, and voice-based communications. For example, a telephone caller may provide responses to the automated call center 11 through a combination of voice, DTMF tones, or text messaging. Callers can also "call" or interface into the automated call center 11 using conventional network clients 19 through an internetwork 17, including the Internet. Other types of automated call center access are possible.

Except as otherwise stated, as used herein, the terms "caller," "user," and "customer" are used interchangeably to refer to a caller to the automated call center 11. Similarly, the terms "agent," "guide," and "operator" are used interchangeably to refer to an agent that provides service provisioning to the caller to the automated call center 11. Additionally, although the automated call center 11 is shown as a single point within the automated call center operation environment 10, the automated call center 11 could include two or more logically interconnected but physically separate, including geographically removed, call center operations, which collectively provide a unified automated call center. Other automated call center arrangements and configurations are possible.

Automated Call Center

Figure 2:
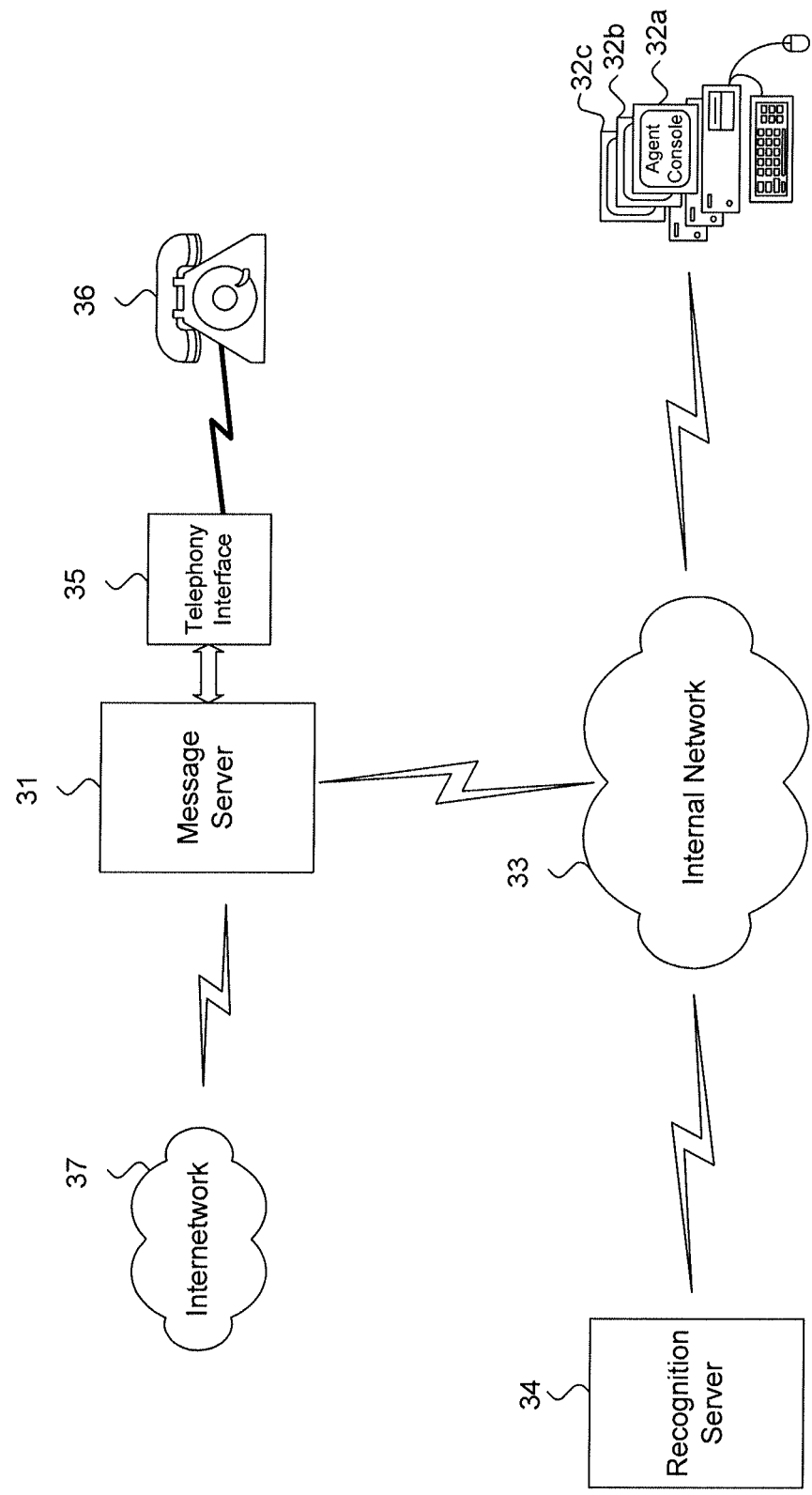
FIG. 2 is a functional block diagram showing the automated call center of FIG. 1.

Generally, an automated call center provides a single dial-in source for support and problem resolution assistance for customers seeking direct help from manufacturers, service vendors, and others. However, automated call centers 11 can also be applied to many other diverse areas of commerce, such as mail order sales and roadside assistance dispatch. FIG. 2 is a functional block diagram showing an automated call center 30 for use in the automated call center operational environment 10 of FIG. 1. The automated call center 30 includes one or more servers 31, 34 and agent consoles 32a-c operatively interconnected over an internal network 33. The agent consoles 32a-c could also be interconnected to the message server 31 over an external network infrastructure 33, such as the Internet or a non-public enterprise data network. The network infrastructure 33 can be either wired or wireless and, in one embodiment, is implemented based on the Transmission Control Protocol/ Internet Protocol (TCP/IP) network communications specification, although other types or combinations of networking implementations are possible. Similarly, other network topologies and arrangements are possible.

A message server 31 provides the primary message-based communications infrastructure for the call center operation, such as described in commonly-assigned U.S. Pat. No. 7,292,689 issued on Nov. 6, 2007, and U.S. Pat. No. 8,170,197 issued on May 1, 2012, the disclosures of which are incorporated by reference. During regular operation, the message server 31 executes multiple threads to process multiple simultaneous calls, which are handled by agents executing agent applications on agent consoles 32a-c.

Customer calls are received through a telephony interface 35, which is operatively coupled to the message server 31 to provide access to a telephone voice and data network 36. In one embodiment, the telephony interface connects to the telephone network 36 over a T-1 carrier line, which can provide individual channels of voice or data traffic. Other types of telephone network connections are possible.

The automated call center 30 also includes a recognition server 34 that interfaces directly to the message server 31 as a top-level or root tier of a speech recognition hierarchy. The message server 31 sends streamed audio data for each user call to the recognition server 34, which then performs distributed speech recognition. The message server 31 assigns grammar generation and speech recognition to the recognition server 34. Upon startup, the telephony gateway 35 opens a T-1 carrier device channel for each available T-1 time slot. The telephony gateway 35 initiates a new connection to the message server 31, one connection per T-1 device channel, and the message server 31, in turn, initiates a corresponding new connection to the recognition server 34.

The separate telephony gateway-to-message server and message server-to-main recognizer connections form one concurrent session apiece. When a customer call is answered or connected, the telephony gateway 35 sends a call message to the message server 31. The message server 31 then sends a new call message to the recognition server 34.

The message server 31 also assigns each new call to one of the agent consoles 32a-c through dynamic load balancing, such as further described in commonly-assigned U.S. Provisional Patent application, entitled "System and Method for Balancing Agent Console Load During Automated Call Processing," Ser. No. 60/838,074, filed Aug. 15, 2006, the disclosure of which is incorporated by reference. Each agent console 32a-c provides the primary means for direct customer interaction by providing service provisioning and related assistance to callers, such as further described below with reference to FIG. 3. The main purpose of each agent console 32a-c is to execute one or more agent applications, which display both user and agent messages and provide menus of actions that can be executed in response to agent commands, including script execution. One or more agent applications execute on each agent console and one or more agent consoles can execute in parallel. Alternatively, multiple instances of agent applications can run on a server machine and can be accessed by agents at agent consoles operating as remote terminals.

Each component, including the message server 31, recognition server 34, and agent consoles 32a-c, is implemented as a computer program, procedure or module, or state transition written as source code or flow specification in a conventional programming language, such as the C++ programming language or modeling tool, and presented for execution by a computer system as object or byte code. Alternatively, the components could be directly implemented in hardware, either as integrated circuitry or burned into read-only memory components. The various implementations of the source code and object and byte codes can be held on a computer-readable storage medium.

Exemplary Typical Call Sequence

Figure 3:
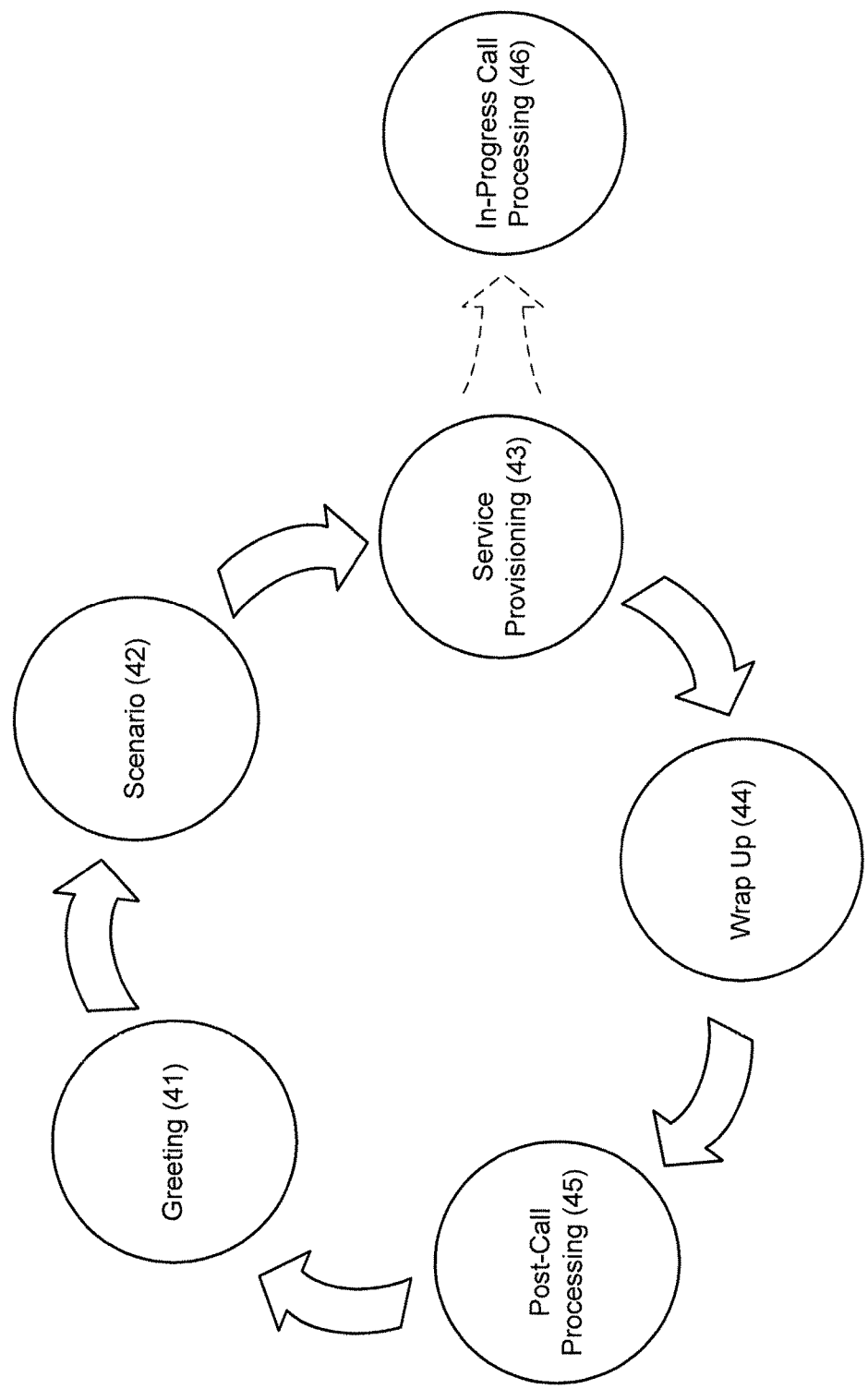
FIG. 3 is a process flow diagram showing, by way of example, a typical call sequence, as transacted in the automated call center of FIG. 2.

Callers to the automated call center interface indirectly with an agent, who multitasks through one or more individual caller sessions via an agent console 32a-c. The callers, however, only perceive an automated calling interface heard, for instance, through their telephone or portable handset. Calls are processed through a sequence of phases. FIG. 3 is a process flow diagram showing, by way of example, a typical call sequence 40, as transacted by the automated call center 30 of FIG. 2. Although the form of call processing required may vary by subject matter area and other factors, the same overall sequence of caller-to-agent interchanges will loosely apply.

Initially, upon calling into the automated call center 30, each user receives an initial greeting and optionally informational message 41 providing a synopsis of caller options. When provided, the caller options enable the user to navigate through to a specific topic area for assistance or support. However, the user could simply proceed directly into a customer support scenario 42 with either an agent, which is a live person; with a guide, which is an automated prompt that is under the supervision of a live person; or through automated voice response to enable information collection, problem trouble-shooting, and other actions. When present, the guide can listen to and revise caller replies in the background, generally unbeknownst to the caller, such as described in commonly-assigned U.S. Patent Application Publication No. 2003/0177009, entitled "System and Method for Providing a Message-Based Communications Infrastructure for Automated Call Center Operation," published Sep. 18, 2003, pending, the disclosure of which is incorporated by reference. Other guide functions and caller dispositions are possible.

The scenario 42 can be delayed by agent unavailability, caller volume capacity limits, and other factors that can delay providing a response to the caller. Throughout the session, the agent can adjust and customize the flow of the call processing by evaluating caller attributes, such as further described in commonly-assigned U.S. Provisional Patent application, entitled "System and Method for Managing a Dynamic Call Flow During Automated Call Processing," Ser. No. 60/838,101, filed Aug. 15, 2006, the disclosure of which is incorporated by reference. In addition, the manner in which information is gathered from the user to determine the proper disposition of the call and to assist the caller can be dynamically evaluated and controlled, as further described below beginning with reference to FIG. 5.

As required, service-provisioning 43 is provided to the user, either directly during the course of the call or indirectly through a service request dispatch. The type of service provided could include sending information or products, entering a subscription or enrollment, or other forms of commerce or assistance that can be remotely provided over the telephone. Finally, the call ends in a wrap-up 44, which provides closure to the call and a departing salutation. Other forms and variations of customer call sequences are feasible. Importantly, however, from the perspective of the caller, the experience may appear to be an interaction with an intelligent machine and the caller would be aware that the agent is automated, not human. Accordingly, the caller would have a more relaxed expectation of agent responsiveness since a machine, and not an actual person, is on the line.

Following call termination, the automated call center 30 can perform post-call processing 45, which identifies individual speech utterances in each call that can be analyzed or stored into a database 34. The identified speech utterances can be presented to an agent for manipulation, such as ranking or reordering. In addition, the post-call processing 45 can include performing speech recognition on the speech utterances, identifying speaker characteristics, and marking certain speech utterances for later use. In a further embodiment, the automated call center 30 can also perform in-progress call processing 46, which operates on a stream of speech utterances copied from on-going calls. The same types of processing operations can be performed as on completed calls, but allows an agent to perform real time call analysis.

Exemplary Agent Console

Figure 4:
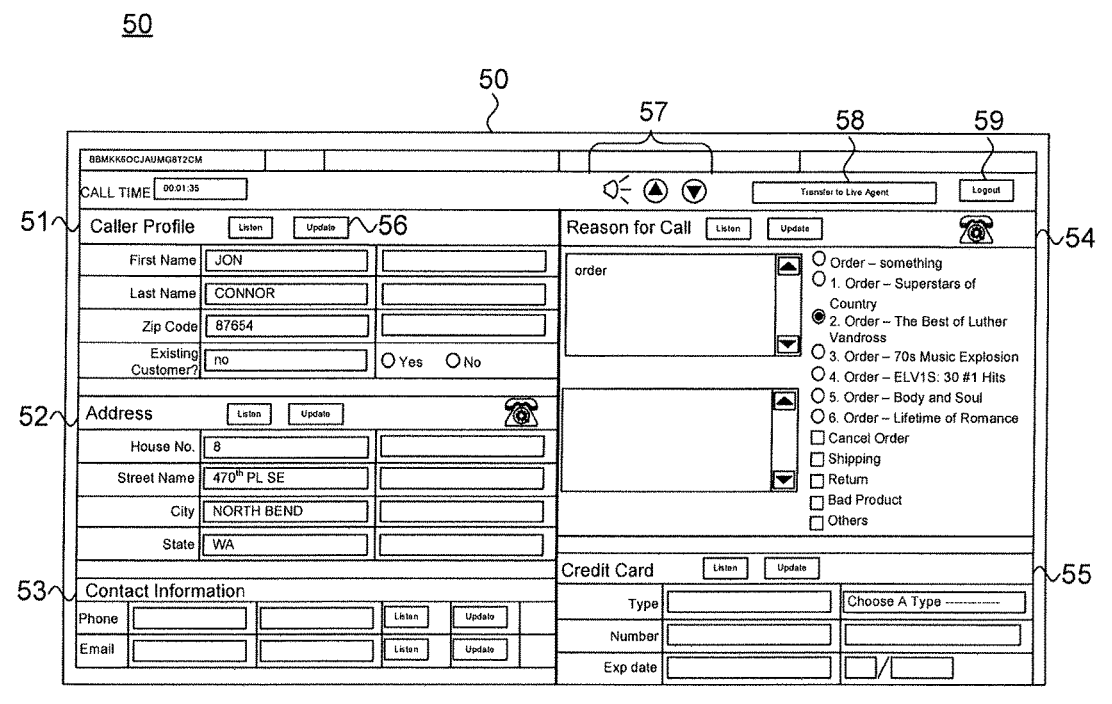

Call sessions are displayed on each agent console through a graphical user interface (GUI). FIG. 4 is a screen diagram showing, by way of example, a view of an agent console 50 for a live call session. Multiple call sessions can be simultaneously displayed and managed through the GUI controls.

The particulars concerning the live call session are obtained by the message server 31 and provided to the agent. The session particulars can include, for instance, caller profile 51, address 52, contact information 53, reason for call 54, and credit card data 55. Other types of session particulars are possible.

Operationally, the agent can review a recording of the caller's spoken responses through intuitive playback controls 57 and update the display by operating an "Update" control 56. Additionally, the agent can transfer the caller to a live agent by operating a "Transfer to Live Agent" control 58 and can log out by operating a "Logout" control 59. Other GUI controls are possible.

Out-of-Order Caller Response Processing

Figure 5:
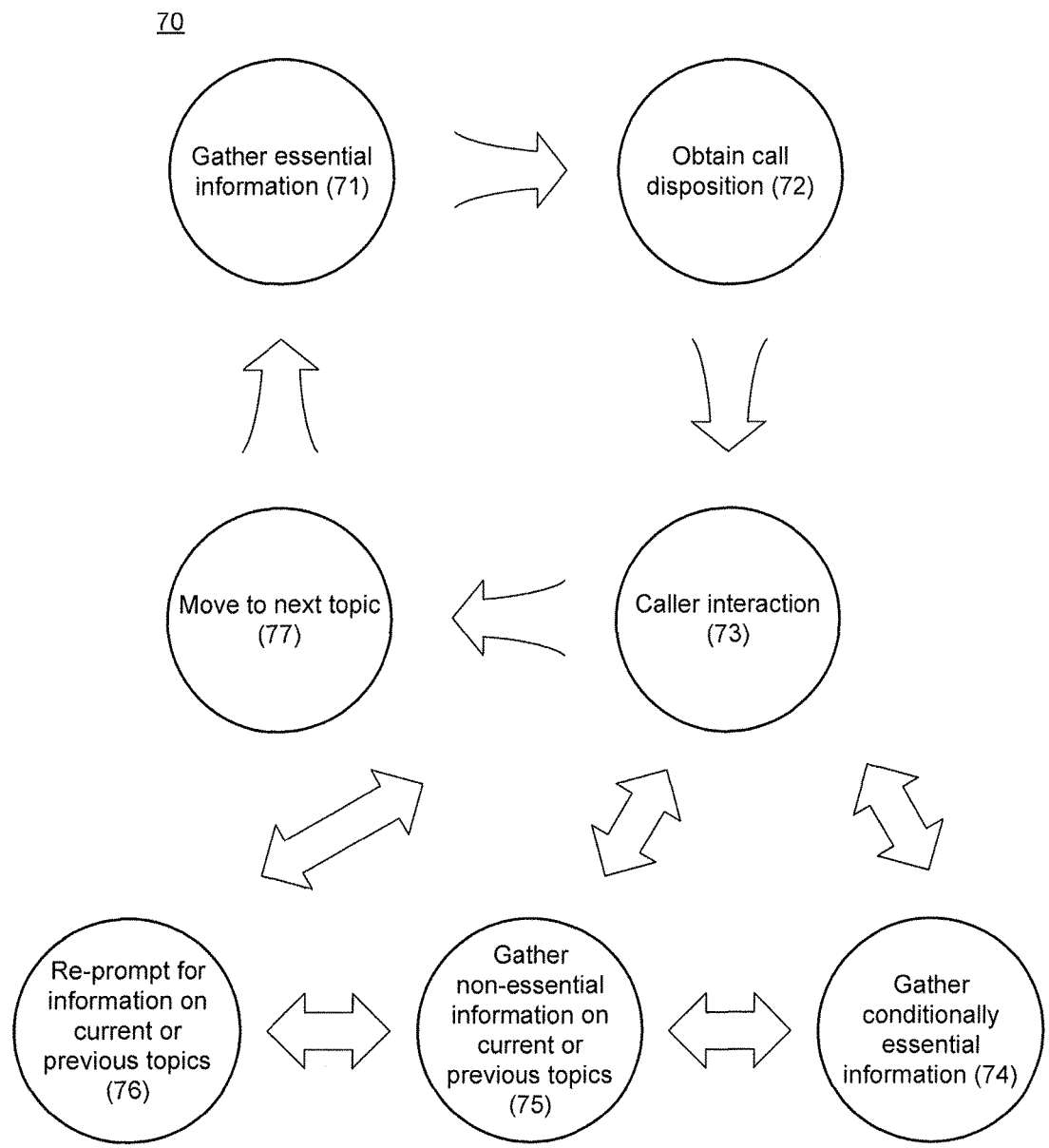
FIG. 5 is a process flow diagram showing a method for processing out-of-order caller responses during automated call processing, in accordance with one embodiment.

The manner in which information is solicited from callers can be provided in part as an open ended dialogue with callers through an agent console 32a-c. FIG. 5 is a process flow diagram showing a method 70 for processing out-of-order caller responses during automated call processing, in accordance with one embodiment. As each agent is indirectly interacting with callers through dialogue that is generated as text-to-speech by the message server 31, allowing calls to be handled in an unstructured sequence can provide agents with extra time in which to multitask, or listen to or review caller messages in near real time.

Before an agent is able to provide assistance to a caller, the agent must first gather any information that is essential to determining the appropriate disposition of the call (operation 71). At a minimum, essential information includes the caller's identify and their reason for calling. Other essential information is possible. Once obtained, the agent can determine the call disposition (operation 72) and begin engaging in automated interaction with the caller (operation 73), such as described above with reference to FIG. 3.

Throughout the call session, the agent can explore various topics by blocks of dialogue during which both conditionally essential and non-essential information on current or previous topics is gathered via information-gathering queries (operations 74 and 75, respectively). Conditionally essential information is essential within the context of the current topic, whereas non-essential information is all other information that is not required to move onto the next topic, including information that is off-topic or extraneous. For instance, credit card information might be essential within the context of shipping products to the caller to ensure payment. By contrast, the types of music that the caller prefers might be non-essential information, yet still be applicable to a separate topic regarding product preferencing. The agent is able to review the session dialogue and can input or correct the information provided at any time throughout the call, not just at the moment at which a caller provides a particular answer. In addition, the agent can re-prompt the caller for any information on the current or previous topics that he or she was unable to gather from the caller's initial utterances (operation 76). The agent can move to a next topic in the dialogue (operation 77) and continue with facilitating problem resolution or service provisioning. Other types of call handling sequencing are possible.

Agent Console Sessions

Figure 6:
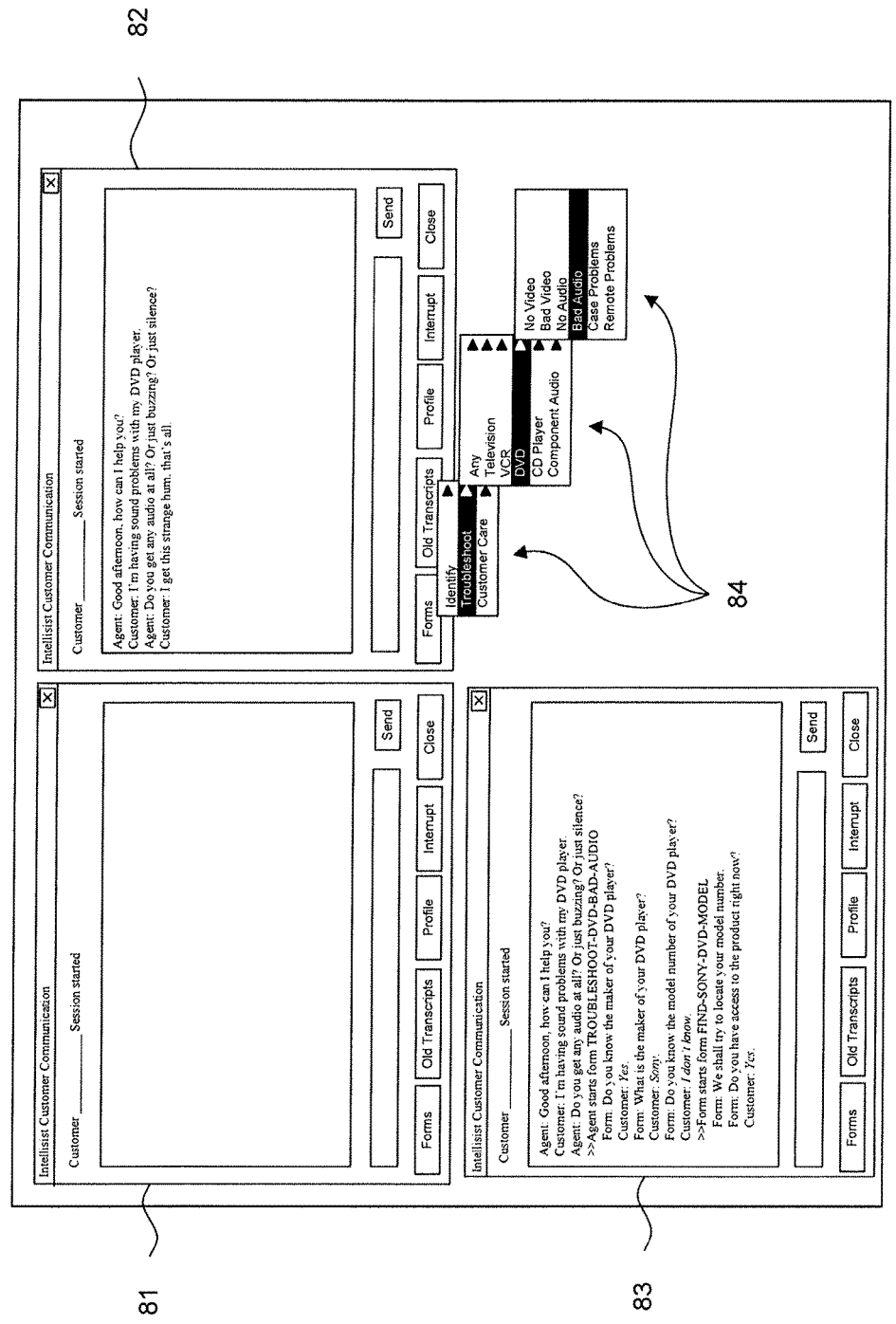
FIG. 6 is a screen diagram showing, by way of further example, a view of an agent console with a plurality of active caller sessions.

Each agent console 32a-c implements a graphical user interface (GUI) for the agent. FIG. 6 is a screen diagram showing, by way of further example, a view of an agent console 80 with a plurality of active caller sessions 81-83. Each session 81-83 appears within the GUI and enables the agent to indirectly interact with a different customer calling through, for instance, the telephony interface 35. The agent can accept new session requests from the messaging server 31 and create a visual session container for each additional session 81-83.

In one embodiment, up to four sessions can be presented to an agent simultaneously. Preferably, the agent can view the contents of all sessions on a single screen or display. One session is designated as the active session and accepts agent comments, such as an instruction to listen to a transcribed user message, play a synthesized agent message to the caller, or activate a script through a menu 84. The agent can switch between active sessions with a single keystroke or pointer click.

Figure 7:
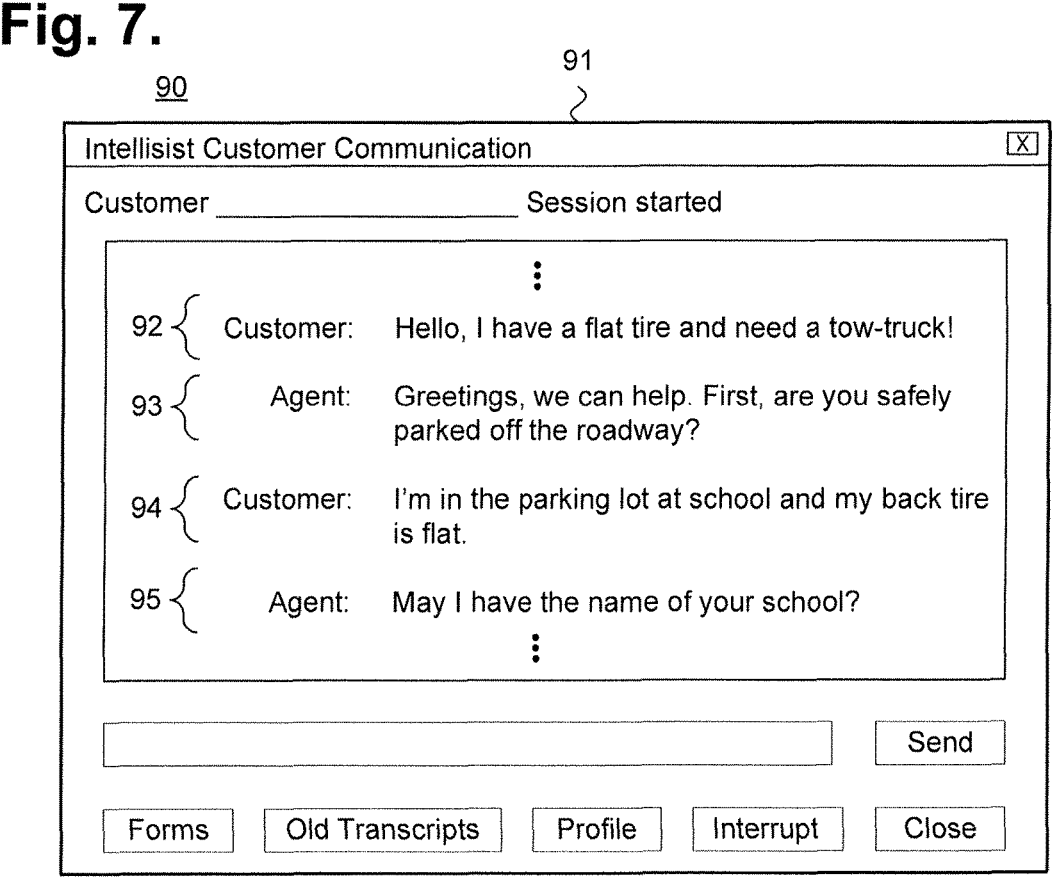
FIG. 7 is a screen diagram showing, by way of further example, a portion of a call dialogue that includes out-of-order caller responses.

Each active caller session 81-83 has a scrolling dialogue in a respective visual session container. FIG. 7 is a screen diagram showing, by way of further example, a portion of a call 90 that includes out-of-order caller responses 91. In the scenario, an elementary school teacher has discovered that her car has a flat tire and is requesting assistance through the automated call center 30. She first provides essential information, including her identity and the nature of her problem, which is a flat tire. Her identity need not be by her name. She could provide her license plate number, telephone number, or any other data, which the agent could use to look up and confirm her identity. Similarly, the nature of her problem need not be selected from a list of finite possibilities. Rather, she can simply state, in plain language, her problem, which is converted from speech to text and displayed on the agent console 32a-c for the agent to read and interpret. As a result, the caller receives a higher level of responsiveness and user friendliness, as the behind-the-scenes agent enables her to speak in a more natural and comfortable manner.

With the essential information having been provided, the agent can then "converse" with the caller and determine that she needs a tow truck (excerpt 92). In response, the agent, through the agent console 32a-c, inquires of the caller's personal safety (excerpt 93), to which the caller explains her location and repeats her problem (excerpt 94). Rather than repeat the question about her personal safety, in free form, the agent, again through the agent console 32a-c, adjusts the line of inquiry to determine her whereabouts (excerpt 95). At this point, the agent can dispatch a tow truck to the teacher on the basis of only knowing her problem and location, deferring obtaining any remaining non-essential information until after the tow truck has been dispatched. Thus, even though the caller is interacting with an automated system, she is able to describe her problem using her own words, rather than having to struggle through countless menus and pre-recorded questions and options. Other forms of unstructured non-sequential and interactive dialogue are possible.

Agent Console

Figure 8:
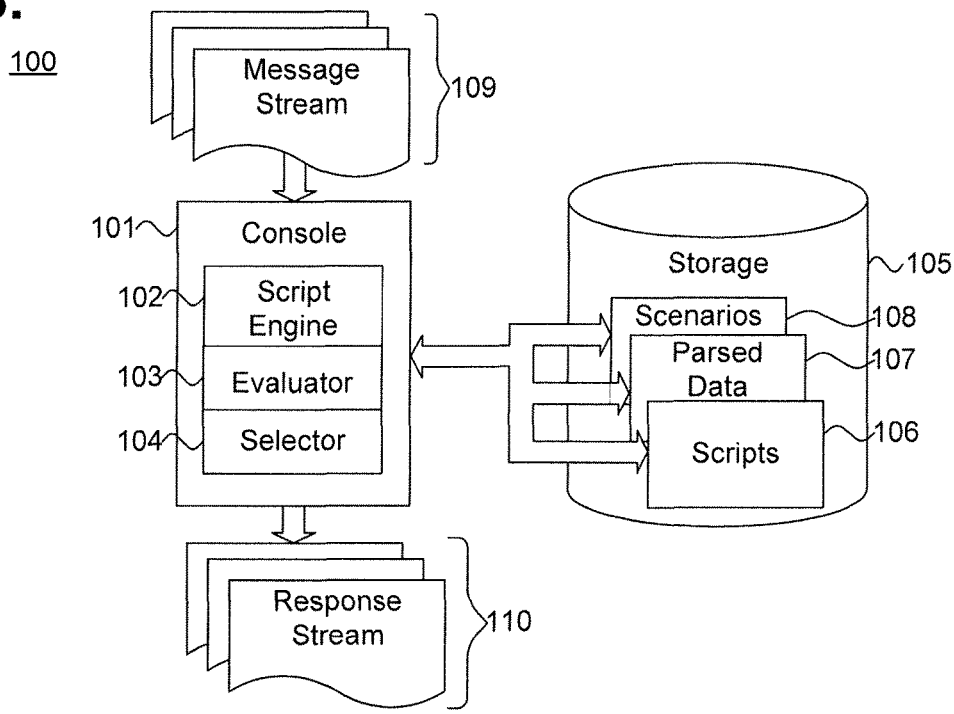
FIG. 8 is a block diagram showing a system for processing out-of-order caller responses during automated call processing, in accordance with one embodiment.

Call handling is primarily controlled by the agent console 32a-c for the agent assigned to handling the call session. FIG. 8 is a block diagram showing a system 100 for processing out-of-order caller responses during automated call processing, in accordance with one embodiment. The system 100 operates in accordance with a sequence of process steps, as described above with reference to FIG. 5.

Throughout the call session, the agent receives a stream of messages 109 and generates a stream of responses 110 through his or her agent console 101. The console 101 includes a script engine 102 that the agent can use to execute stored scripts 106 maintained in a storage device 105, which presents "canned" snippets of interactive dialogue to the caller. However, the scripts 106 are short and are generally single or limited questions intended to ask for particular information, yet which can be presented in any order or sequence as desired by the agent. Additionally, the agent need not use the scripts 106 and can instead choose to manually type dialogue to the caller, which is generated as a spoken response by the message server 31.

The console 101 also includes an evaluator 103 and selector 104, which respectively identify information from the individual caller responses that is stored as parsed data 107 and scenarios 108 of troubleshooting and diagnosis sequences for the agent's use. The parsed data 107 and scenarios 108 are both stored in the storage device 105. Other console functionality is possible.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for processing caller responses, comprising:
   a database to store scripts each comprising a single question; and
   a script selection engine to receive information from a caller during a call with an agent, to receive a selection of at least one of the scripts from the agent based on the received information, to customize a flow of the call by presenting two or more of the scripts in a sequence selected by the agent by receiving responses from the caller in response to the selected scripts and providing a different script selected by the agent after each response from the caller, to provide to the agent a dialogue of the call comprising a transcription of the responses from the agent, each of the responses placed in between the questions of the scripts as occurring during the call, and to receive from the agent corrections to the dialogue during the call.

2. A system according to claim 1, further comprising:
   an agent response module to receive manually typed responses from the agent; and
   a response converter to generate a spoken response for presenting to the caller based on the manually typed dialogue.

3. A system according to claim 1, further comprising:
   a recording module to record spoken responses provided by the caller.

4. A system according to claim 3, further comprising:
   a review module to provide the recorded caller responses for review by the agent.

5. A system according to claim 1, further comprising:
   a conversion module to convert the information from the caller into text; and
   a display module to display the text to the agent.

6. A system according to claim 1, further comprising:
   a call processing module to perform at least one of in-progress call processing and post-call processing, comprising at least one of:

a speech recognizer to perform speech recognition on the received caller and agent responses;

a characteristic identification module to identify characteristics of the caller; and a speech identification module to identify speech utterances by the caller and the agent for analysis and storage in the database.

7. A system according to claim 6, further comprising:

a presentation module to present the identified speech utterances to the agent for manipulation.

8. A system according to claim 7, wherein the manipulation comprises at least one of ranking and reordering the speech utterances.

9. A system according to claim 1, wherein the scripts each comprise at least one question directed to a request for information from the caller.

10. A system according to claim 1, further comprising:

an application module to execute one or more agent applications on an agent console that performs one or more of displaying caller and agent responses and providing menus of actions each executable in response to a command from the agent.

11. A computer-implemented method for processing caller responses, comprising:

storing scripts each comprising a single question;

receiving information from a caller during a call with an agent;

receiving a selection of at least one of the scripts from the agent based on the received information;

customizing a flow of the call by presenting two or more of the scripts in a sequence selected by the agent, comprising:

receiving responses from the caller in reply to the selected scripts; and providing a different script selected by the agent after each response from the caller;

providing to the agent a dialogue of the call comprising a transcription of the responses from the agent, each of the responses placed in between the questions of the scripts as occurring during the call; and receiving from the agent corrections to the dialogue during the call.

12. A method according to claim 11, further comprising: receiving manually typed responses from the agent; and generating a spoken response for presenting to the caller based on the manually typed dialogue.

13. A method according to claim 11, further comprising: recording spoken responses provided by the caller.

14. A method according to claim 13, further comprising: providing the recorded caller responses for review by the agent.

15. A method according to claim 11, further comprising: converting the information from the caller into text; and displaying the text to the agent.

16. A method according to claim 11, further comprising:

performing at least one of in-progress call processing and post-call processing, comprising at least one of:

performing speech recognition on the received caller and agent responses;

identifying characteristics of the caller; and identifying speech utterances by the caller and the agent for analysis and storage in the database.

17. A method according to claim 16, further comprising: presenting the identified speech utterances to the agent for manipulation.

18. A method according to claim 17, wherein the manipulation comprises at least one of ranking and reordering the speech utterances.

19. A method according to claim 11, wherein the scripts each comprise at least one question directed to a request for information from the caller.

20. A method according to claim 11, further comprising:

executing one or more agent applications on an agent console that performs one or more of displaying caller and agent responses and providing menus of actions each executable in response to a command from the agent.

* * * * *